US009858176B2

(12) United States Patent
Machida

(10) Patent No.: US 9,858,176 B2
(45) Date of Patent: Jan. 2, 2018

(54) SOFTWARE AGING TEST SYSTEM, SOFTWARE AGING TEST METHOD, AND PROGRAM FOR SOFTWARE AGING TEST

(71) Applicant: NEC Corporation, Minato-ku, Tokyo (JP)

(72) Inventor: Fumio Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 17 days.

(21) Appl. No.: 14/909,519

(22) PCT Filed: Aug. 6, 2014

(86) PCT No.: PCT/JP2014/070688
§ 371 (c)(1),
(2) Date: Feb. 2, 2016

(87) PCT Pub. No.: WO2015/022890
PCT Pub. Date: Feb. 19, 2015

(65) Prior Publication Data
US 2016/0188449 A1 Jun. 30, 2016

(30) Foreign Application Priority Data
Aug. 12, 2013 (JP) .................................. 2013-167466

(51) Int. Cl.
*G06F 9/44* (2006.01)
*G06F 11/36* (2006.01)
*G06F 11/34* (2006.01)

(52) U.S. Cl.
CPC ...... *G06F 11/3688* (2013.01); *G06F 11/3433* (2013.01); *G06F 11/368* (2013.01);
(Continued)

(58) Field of Classification Search
None
See application file for complete search history.

(56) References Cited

U.S. PATENT DOCUMENTS 6,609,216 B1 * 8/2003 Almy ............... G06F 11/3419
714/25
6,728,900 B1 * 4/2004 Meli ............... G06F 11/2236
702/64

(Continued)

FOREIGN PATENT DOCUMENTS

JP 2011-090457 A 5/2011
JP 2012-234448 A 11/2012

OTHER PUBLICATIONS

Felix Langner and Artur Andrzejak, Detecting Software Aging in a Cloud Computing Framework by Comparing Development Versions, In Proceeding of International Symposium on Integrated network Management (IM), May 27, 2013 p. 896-899.
(Continued)

*Primary Examiner* — Chameli Das

(57) ABSTRACT

Load test is executed with an appropriate frequency which does not lead to a decrease in software development efficiency and a decrease in the precision of software aging detection. Load test of a version of software under test is executed in accordance with an execution criterion, presence or absence of a software aging problem is detected by comparing a test result of the load test with a test result of load test of a previous version of the software to be compared, and frequency of execution of subsequent load test is adjusted by changing the execution criterion based on a result of the detection.

16 Claims, 7 Drawing Sheets

(52) U.S. Cl.
CPC ...... *G06F 11/3692* (2013.01); *G06F 11/3409* (2013.01); *G06F 11/3428* (2013.01); *G06F 2201/81* (2013.01); *G06F 2201/865* (2013.01)

(56) References Cited

U.S. PATENT DOCUMENTS

| | | | | |
|---|---|---|---|---|
| 7,437,717 | B1* | 10/2008 | Cowan | G06F 8/71 717/131 |
| 2002/0066077 | A1* | 5/2002 | Leung | G06F 11/368 717/126 |
| 2003/0079154 | A1* | 4/2003 | Park | G06F 11/1438 714/1 |
| 2006/0129994 | A1* | 6/2006 | Srivastava | G06F 11/3676 717/124 |
| 2007/0180490 | A1* | 8/2007 | Renzi | G06F 21/577 726/1 |
| 2009/0204795 | A1* | 8/2009 | Nasuto | G06F 11/3404 712/227 |
| 2012/0151468 | A1* | 6/2012 | Wookey | G06F 8/68 717/175 |
| 2012/0311389 | A1 | 12/2012 | Pasala et al. | |
| 2014/0310693 | A1* | 10/2014 | Elston | G06F 11/3688 717/129 |

OTHER PUBLICATIONS

International Search Report for PCT Application No. PCT/JP2014/070688, dated Nov. 4, 2014.

English translation of Written opinion for PCT Application No. PCT/JP2014/070688.

* cited by examiner

Fig. 5

| Date | Revision | Tag | User | Comment |
|---|---|---|---|---|
| 5/20 | 53 | | Alice | Function A is updated |
| 5/21 | 54 | 0.7 | Bob | Function B is added |
| 5/21 | 55 | | Alice | A bug in function A is removed |
| 5/22 | 56 | | Carol | Function C is updated |
| 5/23 | 57 | | Dave | Function D is added |
| 5/23 | 58 | | Bob | Function B is modified |
| 5/24 | 59 | | Dave | A bug in function D is removed |

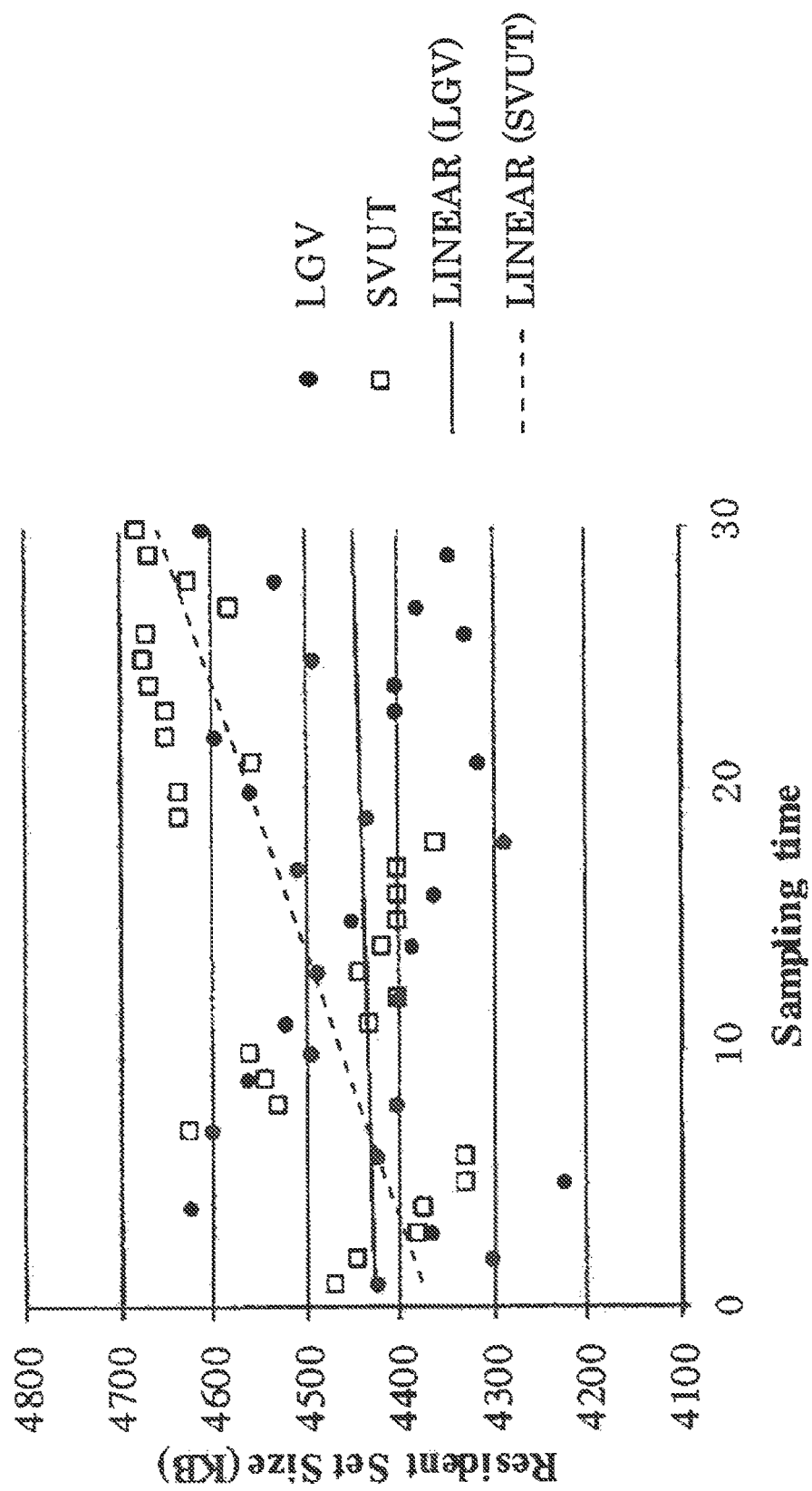

SOFTWARE AGING TEST SYSTEM, SOFTWARE AGING TEST METHOD, AND PROGRAM FOR SOFTWARE AGING TEST

This application is a National Stage Entry of PCT/JP2014/070688 filed on Aug. 6, 2014 which claims priority from Japanese Patent Application 2013-167466 filed on Aug. 12, 2013 the contents of all of which are incorporated herein by reference, in their entirety.

TECHNICAL FIELD

The present invention relates to a software aging test system, a software aging test method, and a program for software aging tests and, in particular, to a software aging test system, a software aging test method, and a program for software aging tests that are capable of improving the efficiency of development of software.

BACKGROUND ART

Software aging is degradation of an execution environment of software due to prolonged continuous operation of the software. Software aging progresses with time and leads to degradation of the program processing performance and an increase in the system failure rate. Most of the software aging problems are caused by defects of software (bugs in programs). A memory leak is a typical example of software aging which is caused by failure to release memory. When such a defect is found after the release of the software, system operation can be compromised, leading to decrease in reliability. It is therefore desirable to eliminate defects that can cause software aging as much as possible before the release of the software.

In order to detect software aging problems before the software is released, a load test is required in which the software is actually operated on a computer, workload is given to the software, and the operation of the software is observed. However, such load test is costly and time consuming because the load test requires a provision of an experimental environment for executing the testing. In particular, detection of software aging problems requires prolonged continuous operation and continuous monitoring. In order to increase the efficiency of load test for detecting software aging, a test method described in NPL 1 has been proposed.

NPL 1 describes a method for detecting software aging trends by comparing results of load test of a current version of software to be tested with results of load test of a past version of the same software. For example, if the past version does not exhibit an upward trend in memory consumption while the current version exhibits an upward trend in memory consumption, it can be determined that the current version has a high probability of containing defects that can cause software aging. Since the determination is made by comparison with past trends, signs of problems can be identified early before prolonged operation of the software.

Note that the term "software aging problem" as used in the description and the claims means the risk of software aging latent in software.

CITATION LIST

Non Patent Literature

NPL 1: Felix Langner and Artur Andrzejak, Detecting Software Aging in a Cloud Computing Framework by Comparing Development Versions, In Proceeding of International Symposium on Integrated network Management (IM), 2013.

SUMMARY OF INVENTION

Technical Problem

On the other hand, the method for detecting software aging described in NPL1 has the following problems. A first problem is that executing load test at each commit of a program significantly decreases the efficiency of the development. Comparison and evaluation with a previous version requires regular load test and monitoring of resource consumption. Since load test requires certain amount of time and cost, the efficiency of the development decreases and the cost increases when load test is executed at each commit.

A second problem is that when load test is executed for a set of versions as a unit, the precision of software aging detection by comparison and evaluation decreases. When load test is executed for a set of versions as a unit, since there are many additions and updates of program codes to the previous version, the probability for the tendency that the result of a version will is different from the result of previous version thereof will be high. When it is determined as a result of comparison and evaluation that there is a software aging problem, the detection can be attributed to addition of a feature and can therefore be a false positive. When many features have been added or many updates have been made after a previous version, it is difficult to determine whether detection is a false positive.

As described above, the existing method for detecting software aging based on version comparison has not focused on the frequency with which comparison is executed.

OBJECT OF INVENTION

An object of the present invention is to provide a software aging test system, method and program that execute load test with an appropriate frequency so that a decrease in software development efficiency due to high-frequency load test and a decrease in the precision of software aging detection due to low-frequency load test are avoided.

Solution to Problem

A software aging test system of the present invention is a system in which load test of a version of software under test is executed in accordance with an execution criterion, presence or absence of a software aging problem is detected by comparing a test result of the load test with a test result of load test of a previous version of the software to be compared, and frequency of execution of subsequent load test is adjusted by changing the execution criterion based on a result of the detection.

A software aging test method of the present invention includes executing load test of a version of software under test in accordance with an execution criterion; detecting presence or absence of a software aging problem by comparing a test result of the load test with a test result of load test of a previous version of the software to be compared; and adjusting frequency of execution of subsequent load test by changing the execution criterion based on a result of the detection A program for software aging test of the present invention causes a computer to execute operation to execute load test of a version of software under test in accordance with an execution criterion, detect presence or absence of a software aging problem by comparing a test result of the load test with a test result of load test of a previous version of the software to be compared, and adjust the frequency of execution of subsequent load test by changing the execution criterion based on a result of the detection.

Advantageous Effects of Invention

According to the present invention, load test can be executed with an appropriate frequency so that a decrease in software development due to high-frequency load test and a decrease in the precision of software aging detection due to low-frequency load test are avoided.

BRIEF DESCRIPTION OF DRAWINGS

FIG. 5 is a table illustrating an example of a commit log stored in a software version management storage device of an example according to the present invention.

FIG. 7 is a graph of results of load test comparison when software aging problems were detected.

DESCRIPTION OF EMBODIMENTS

First Exemplary Embodiment

[Description of Configuration]

A first exemplary embodiment of the present invention will now be described in detail with reference to the drawings.

Figure 1:
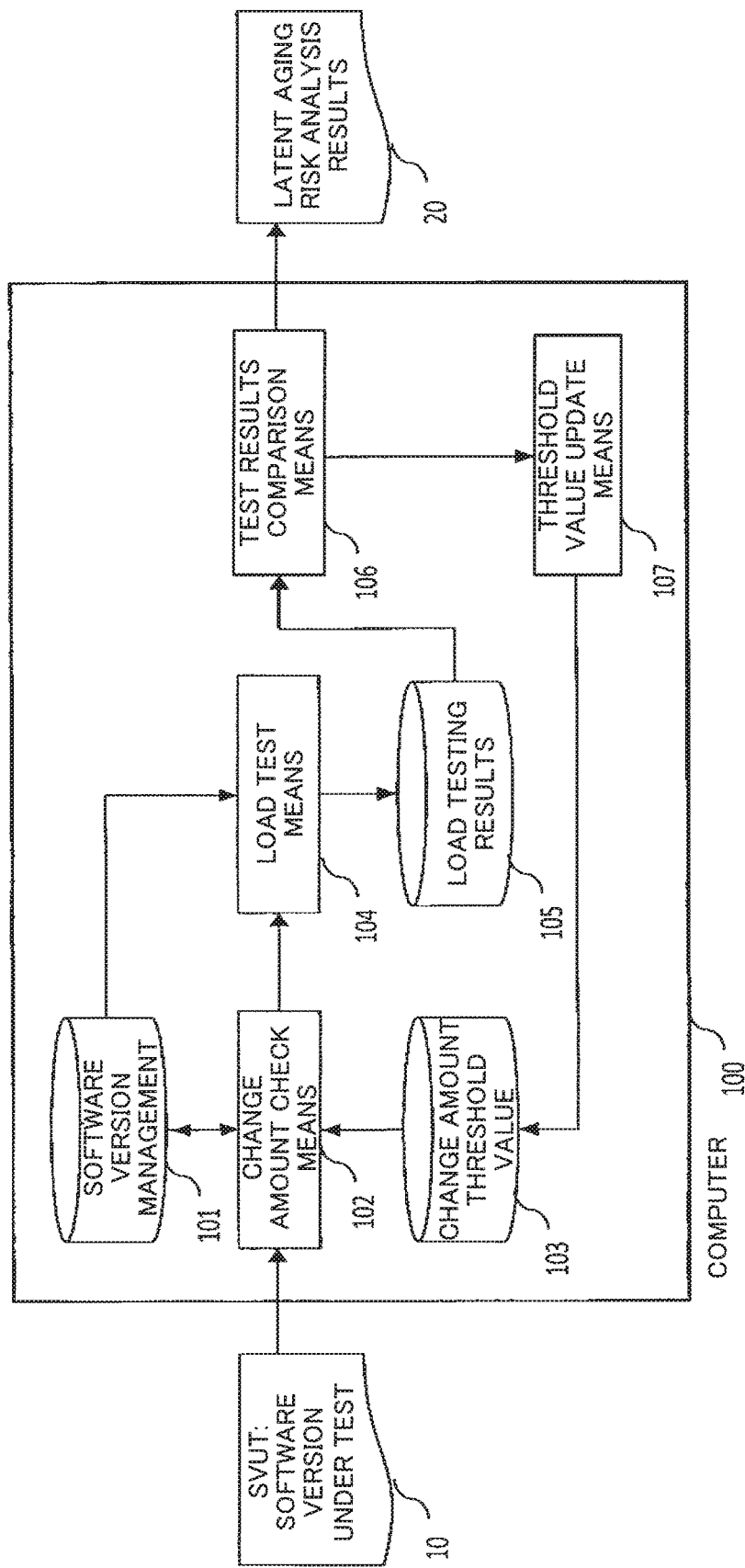
FIG. 1 is a block diagram illustrating a configuration of a first exemplary embodiment of the present invention.

Referring to FIG. 1, in the first exemplary embodiment of the present invention, a version of software to be tested (also referred to as a software version under test (SVUT)) 10 is provided as an input to a computer (also referred to as a central processing unit, processor or data processing device) 100 operating under the control of a program and results of latent aging risk analysis 20, which are results of analysis of aging risk latent in the software version under test, are output. The computer 100 includes a software version management storage device 101 which manages versions of software, a change amount check means 102 which checks an amount of change in a software version under test, a change amount threshold value storage device 103 which stores a change amount threshold value that serves as a criterion for determining whether to execute load test, load test means 104 which executes load test of software, a load test results storage device 105 which stores results of load test, test results comparison means 106 which compares a result of load test with a past result, and threshold value update means 107 which updates the change amount threshold value based on the results of comparison.

Note that the computer 100 corresponds to a software aging test system in the claims, the change amount check means 102 corresponds to determination means, the load test means 104 corresponds to execution means, the test results comparison means 106 corresponds to detection means, and the threshold value update means 107 corresponds to update means. The term "software version" or simply "version" as used herein means a version of software of interest.

Each of the means mentioned above operates as generally described below.

The change amount check means 102 checks an amount of change in an software version under test from a previous good software version in which no software aging problems have been detected (if there are a plurality of previous good software versions, the latest good version, for example) to determine whether the amount of change has reached a threshold value. The change amount check means 102 performs control so that load test is executed only when the amount of change has reached the threshold value.

The load test means 104 causes a software version under test to be executed when the change amount reaches the threshold value, observes state changes in an execution environment when a workload is placed on the software version under test, and stores results of measurement in the load test results storage device 105.

The test results comparison means 106 compares the result of load test of a software version under test with the result of load test of a previous version to be compared, detects whether a software aging problem exists, and outputs the result of the detection.

The threshold value update means 107 updates the change amount threshold value based on the result of software aging detection so as to appropriately change intervals at which subsequent load test is executed.

These means interact with each other each time load test is executed, so as to adjust the intervals at which load test for detecting software aging and version comparison are executed, thereby implementing software aging detection with improved accuracy while improving the efficiency of development.

[Description of Operation]

Entire operation of this exemplary embodiment will be described in detail below with reference to the flowcharts of FIGS. 1 and 2.

Figure 2:
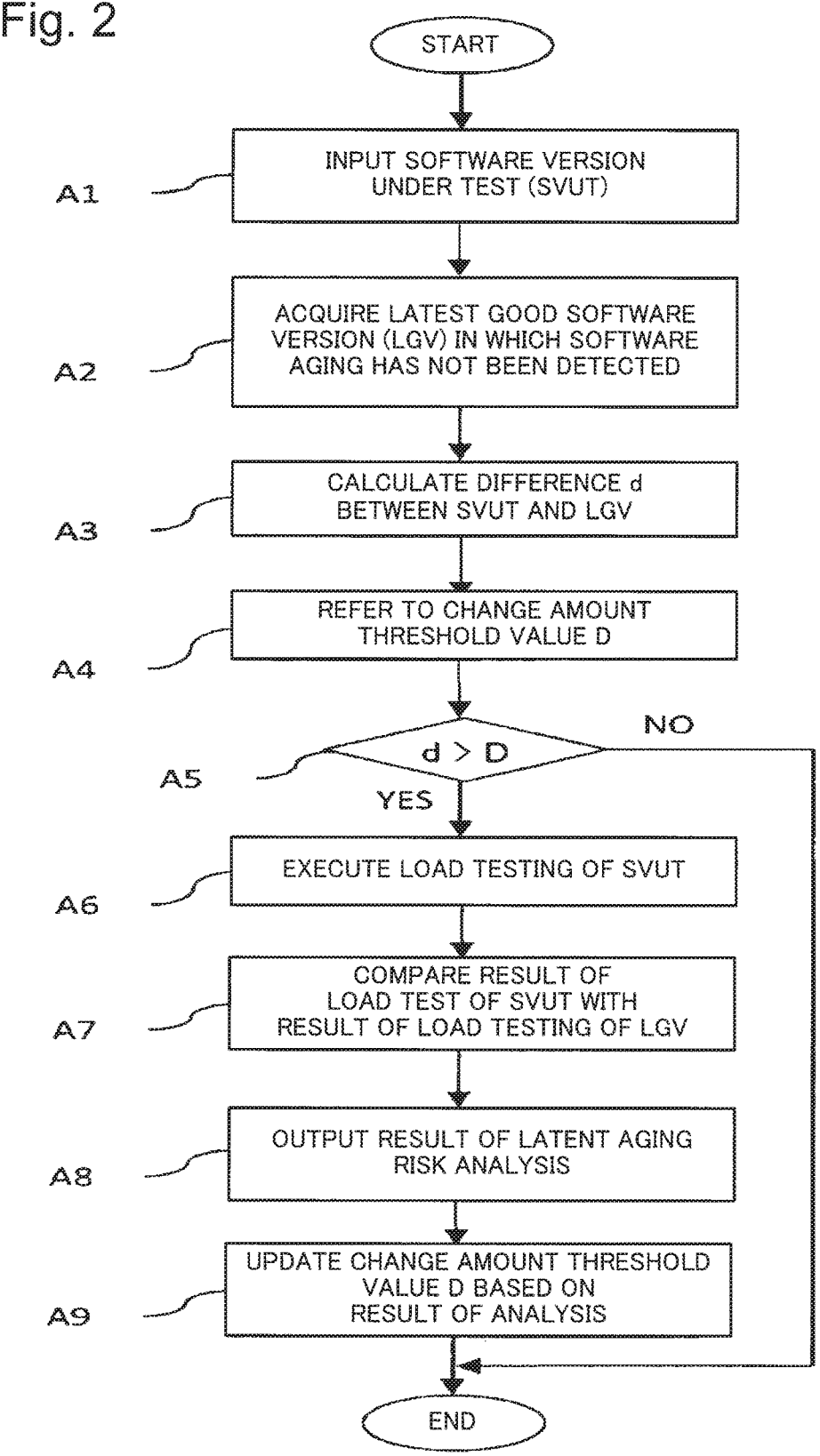
FIG. 2 is a flowchart illustrating an operation of the first exemplary embodiment.

First, a software version under test (SVUT) is determined (step A1 in FIG. 2). Then, the software version management storage device 101 is referred to and the latest good software version (LGV) in which no software aging problem has been detected is retrieved (step A2). The change amount check means 102 obtains a difference (also referred to as an amount of change) d between the software version under test and the latest good software version (step A3).

The difference may be the number of source code lines added after a good software version, the number of commits recorded in the software version management storage device 101, the number of added features, the number of functions relating to memory management, the number of objects accessed, the number of newly added external libraries, an elapsed time period or the like. The change amount check means refers to a threshold value D stored in the change amount threshold value storage unit 103 and compares the threshold value D with the obtained difference d (step A4, step A5).

When the difference d has not reached the threshold value D (NO at step A5), the process ends without executing load test for detecting software aging. When the difference d has reached the threshold value D (YES at step A5), load test of the SVUT is executed by the load test means 104 and changes in system metrics values in the load test are recorded (step A6).

The system metrics to be measured are metrics that are likely to indicate software aging trends and include, for example, a free memory capacity, the size of physical memory currently being used by an application, a used swap size, a free disk capacity, and the number of processes. One or more of these metrics may be measured. Measured metrics values are recorded in the load test results storage device 105.

Then, the test results comparison means 106 compares a change in a value of system metrics when load test of the latest good software version has been executed with a change in a value of the system metrics when load test of the software version under test has been executed (step A7). The comparison may be performed using the method described in NPL 1, a method of statistically analyzing a difference between trends, or a simple visual inspection method.

Results of the comparison are output as results of risk analysis of software aging in the software version under test (step A8). The results of the analysis may include system metrics that exhibit software aging problems, the presence or absence of a software aging trend, and the probability of software aging and are preferably metrics that provide a criterion for a human tester to determine whether to investigate in detail software defects that can cause software aging.

Lastly, the threshold value update means 107 updates the change amount threshold value based on the results of the analysis of the probability of software aging so that the efficiency of load test is improved (step A9). For example, when little software aging trends have been found as a result of the testing, the threshold value update means 107 updates the threshold value D so as to lengthen the intervals at which testing is executed (increase the threshold value of the number of code lines, the number of commits, the elapsed time period or the like). On the other hand, when a plurality of software aging traces have been found, for example, the threshold value update means 107 updates the threshold value D so as to shorten the intervals at which load test is executed (decrease the threshold value of the number of code lines, the number of commits, the elapsed time or the like).

Description of Advantageous Effects

Advantageous effects of this exemplary embodiment will be described below.

Since this exemplary embodiment is configured so that the possibility of software aging is analyzed by comparing results of load test and a threshold value for determining intervals at which load test is executed is changed based on the result of the analysis, a decrease in the efficiency of development due to high-frequency load test and a decrease in precision of problem detection due to low-frequency load test can be avoided.

Specifically, when no software aging problem has been found as a result of load test, the change amount threshold value is updated so as to lengthen the intervals at which load test is executed, thereby avoiding high-frequency load test to improve the efficiency of the software development. When a software aging problem has been detected as a result of load test, the change amount threshold value is updated so as to shorten the intervals at which load test is executed. Accordingly, detection and evaluation of software aging can be executed at shorter intervals than the intervals of version-by-version comparison and therefore, a decrease in the precision of detection of software aging due to low-frequency version-by-version load test can be avoided. Thus, load test of software is executed at appropriate timing without decreasing the efficiency of the software development and software aging problems can be detected early with a high level of precision. Further, since the comparison is made with the latest good software version that is free of software aging problems, software aging trends can be accurately identified. Accordingly, the precision of software aging problem detection can be increased.

Second Exemplary Embodiment

[Description of Configuration]

A second exemplary embodiment of the present invention will be described next in detail with reference to drawings.

Figure 3:
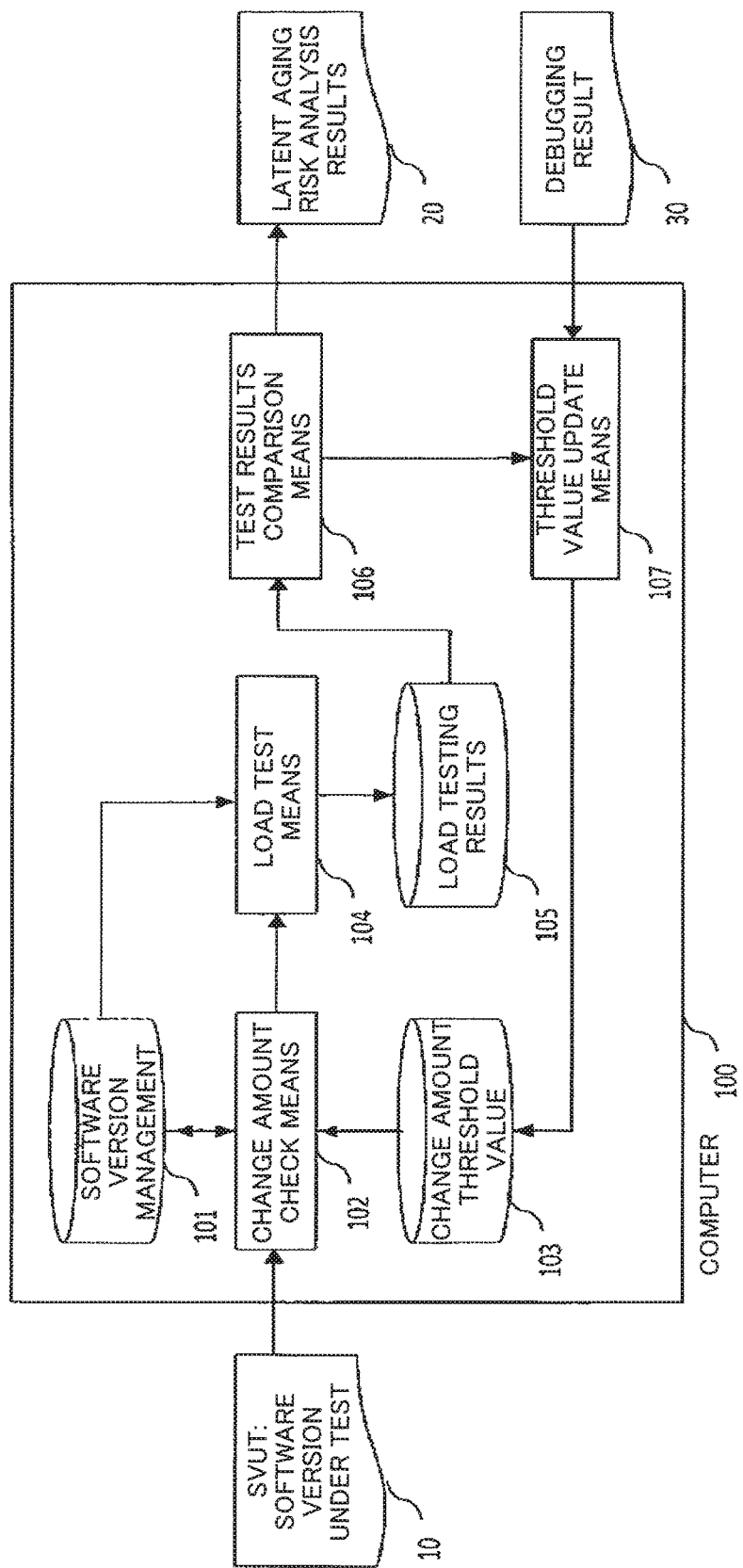
FIG. 3 is a block diagram illustrating a configuration of a second exemplary embodiment of the present invention.

Referring to FIG. 3, the second exemplary embodiment of the present invention differs from the first exemplary embodiment in that debugging result 30 is input in the threshold value update means 107 in the configuration of the first exemplary embodiment in FIG. 1 through debugging result input means (not depicted).

[Description of Operation]

The debug result input means of a computer 100 accepts an input of a result of debugging performed when a software aging problem has been detected, and sends the accepted result of debugging to the threshold value update means 107. On the basis of the result of debugging and a result of software aging detection acquired from test results comparison means 106, the threshold value update means 107 determines whether to update a threshold value.

Entire operation of this exemplary embodiment will be described below in detail with reference to the flowcharts of FIGS. 3 and 4.

Figure 4:
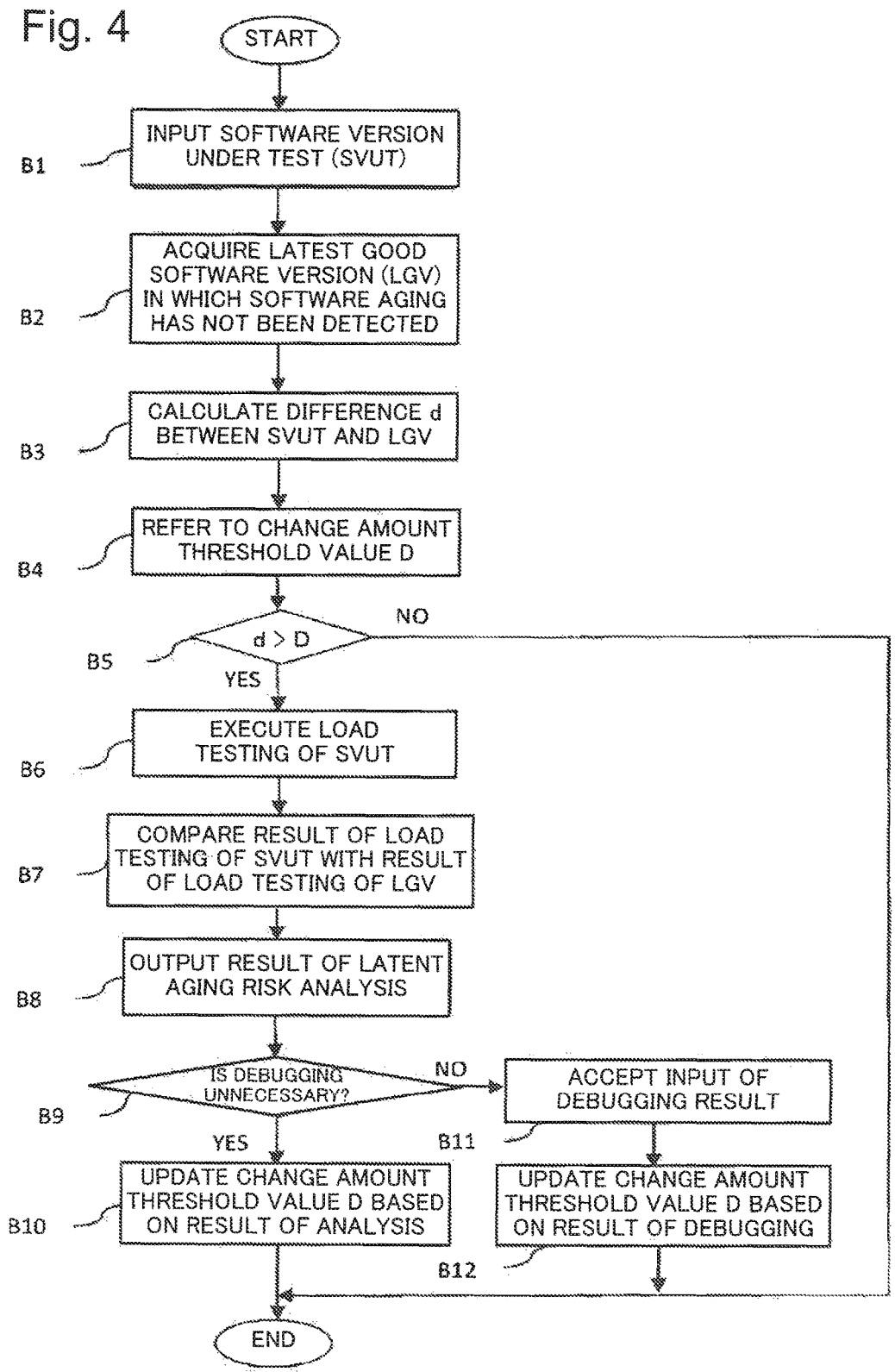
FIG. 4 is a flowchart illustrating an operation of the second exemplary embodiment.

The operation up to step B8 of the flowchart in FIG. 4 is the same as the corresponding part of the operation of the first exemplary embodiment in the flowchart in FIG. 2. However, the test results comparison means 106 may determine, based on the result of analysis of the risk of software aging, whether the software needs to be debugged and may include the result of the determination in latent aging risk analysis results 20. For example, when even one software aging problem is detected, it may be determined that debugging is needed. Alternatively, the need for debugging may be pointed out only when the possibility of existence of software aging exceeds a given probability (step B9). When it is determined that debugging is unnecessary (YES at step B9), the threshold value update means 107 updates a change amount threshold value based on the result of the analysis of the possibility of software aging in accordance with the operation of the first exemplary embodiment so as to improve the efficiency of testing (step B10).

On the other hand, when it is determined that debugging is necessary (NO at step B9), debugging of the software is performed by a developer and the result of the debugging (for example the presence or absence of a software aging problem) is accepted by debugging result input means (step B11). The debugging reveals whether software defects that cause software aging problems are actually contained in the software. The threshold updating means 107 determines whether the result of the analysis agrees with the result of the debugging and updates the change amount threshold value so as to improve the efficiency of testing (step B12). For example, when the debugging reveals that most of the software aging problems are false positives, the intervals of testing can be too long and therefore, the threshold value D is updated so as to shorten the intervals of testing. On the other hand, when the result of the debugging adequately agrees with the result of the analysis, problems have been properly detected using the current intervals of testing and therefore, the current threshold value D is maintained. Alternatively, when the intervals of testing are short, the threshold value D may be updated so as to lengthen the intervals because the intervals of testing may be able to be slightly lengthened.

Description of Advantageous Effects

Advantageous effects of the mode for carrying out the present invention will be described next.

The mode for carrying out the present invention is configured so that the test results comparison means 106 determines whether software needs to be debugged and the threshold value updating means 107 sets a threshold so as to reduce false positives of software aging based on a difference between the result of debugging and the result of analysis. Accordingly, the precision of software aging detection can be increased.

EXAMPLES

Operations of modes for carrying out the present invention will be described with specific examples.

Assume that a development team consisting of a plurality of members is developing software. The source code of the software is stored in a software version management storage device 101 and shared among the development members. The members develop respective functions assigned to them and commit updates to the software version management storage device 101. The object is to efficiently perform software aging testing of the software being developed.

FIG. 5 illustrates an example of a commit log recorded in the software version management storage device 101. Each row of the commit log records when (Date) and what kind of update has been made by whom (User). What kind of change has been made by each member who commits is written in the Comment column. Revision indicates the serial numbers of commits recorded in the software version management storage device 101 and the values are updated automatically each time a commit is made. Tag represents labels each of which is used for recording a snapshot of the software at a given time point and, in the example in FIG. 5, indicates that a tag of version 0.7 has been assigned by Bob on May 21. Such a commit log is commonly used in version management systems such as Subversion and is not specialized for a particular software version management system.

It is assumed here that load test of the version of the software tagged with 0.7 has been executed and no software aging problem has been found. Version 0.7 is the latest good software version (LGV) in which software aging has not been detected. Subsequently, the change amount check means 102 determines whether load test needs to be executed as the development of the software progresses. For example, assume that the change amount threshold value D stored in the change amount threshold value storage device 103 is the number of commits=5. In this case, load test is not executed until the number of commits reaches 5 at step A5 of the process in the flowchart of FIG. 2. Referring to the commit log in FIG. 5, the revision number is updated to 59 by a commit by Dave on May 24 and the number of commits made since the latest good software version (LGV) reaches 5. Accordingly, this version becomes the subject of load test and the load test is executed by load test means 104. System metrics values are monitored at regular intervals during the load test and the result of observations are stored in the load test results storage device 105. Then the test results comparison means 106 compares the result of the load test of the software version under test (SVUT) with the result of the load test of the latest good software version (LGV).

Case 1

Figure 6:
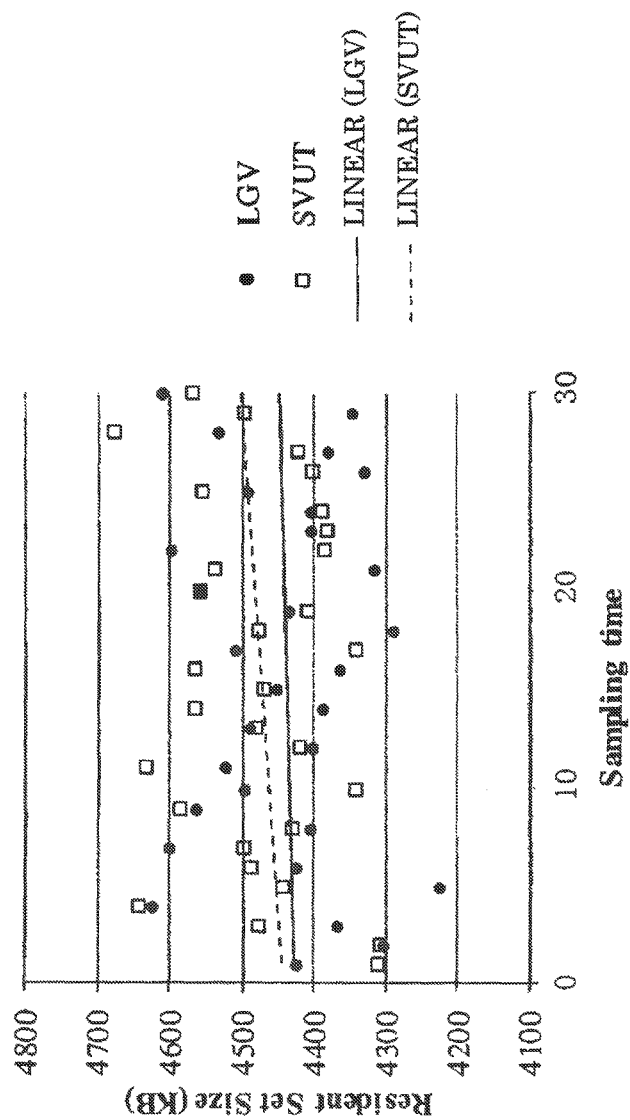
FIG. 6 is a graph of results of load test comparison in an example of the present invention when software aging problems were not detected.

Consider a case where results in FIG. 6 have been obtained as a result of observation of changes in memory (Resident Set Size) consumed by the software during load test. Values observed in the software version under test (SVUT) and the latest good software version (LGV) and approximate curves obtained by linear regression analysis of the observed values are illustrated. As can be seen from the comparison between the slopes of the approximate curves, the slopes of the software version under test (SVUT) and the latest good software version (LGV) do not greatly differ from each other. Accordingly, it is determined in this case that software aging does not exist in the software version under test. For the determination, a specific difference threshold value may be used. For example, when the difference in change amount of the Resident Set Size is less than or equal to 2.0, it is determined that software aging does not exist. On the basis of this result, the threshold value update means 107 determines that the current intervals of load test can be lengthened and changes the threshold value of the number of commits from 5 to 7, for example. The change of the setting defers the execution of the next load test and allows more updates to be made in the interval, leading to improvement of the efficiency of development.

Case 2

Assume that observed changes in the amount of memory are as illustrated in FIG. 7. Comparing the slopes of lines obtained by linear regression analysis of values observed in a software version under test (SVUT) and values observed in a latest good software version (LGV), it is obvious that there is a great trend change in the software version under test. In such a case, it is determined that there are software aging problems in the software version under test. A specific difference threshold value may be used for the determination. For example, when the difference in change amount of the Resident Set Size is greater than or equal to 5.0, it is determined that software aging problems exist. It is assumed that debugging is required when analysis reveals that there is an aging problem. When it is determined that debugging is required, the developers analyses the source code in order to find the causes of the software aging. The results of the analysis are input in the threshold value update means 107.

Consider a situation where a defect that causes software aging has been found as a result of debugging. This means that the detection of software aging problems by comparison between versions is correct. Accordingly, the current intervals of load test is appropriate for detecting software aging and the threshold value update means chooses to maintain the current threshold value. Since the accuracy of detection is adequate, the threshold value may be updated so as to lengthen the intervals of load test. By maintaining or updating the threshold value to maintain appropriate intervals of testing or lengthen the intervals of testing, the efficiency of the development can be increased while maintaining the accuracy of detection.

Case 3

Consider a case where the observations in FIG. 7 have been obtained and it has been determined that software aging exists, but debugging has revealed that the determination is faulty. In other words, the result of software aging problem detection by comparison between versions is faulty. A trend change is caused by a factor such as addition of a required function. In order to reduce the source code analysis efforts due to false positives, it is important to find such a basic trend change as early as possible. The threshold update means therefore changes the threshold value of the number of commits from 5 to 4, for example, so that a false positive can be detected as early as possible. Since comparison of versions in load test is performed more frequently as a result of the setting change, a false positive problem can be solved as early as possible to improve the efficiency of development.

While the threshold value of the number of commits is used in the example described above, one or more software metrics such as the number of changed lines in the source code, the number of added features, the number of functions relating to memory management, the number of objects accessed, the number of newly added external libraries, or an elapsed time period and the like may be used instead of the number of commits.

While Resident Set Size has been taken as an example of an indicator of a software aging trend, one or more indicators such as a free memory capacity, a virtual memory size, a used swap size, a free disk capacity, the number of processes and the like can be observed and used in comparison and evaluation.

While an example has been described in which linear regression analysis of measurements is used for liner approximation, other methods such as a non-parametric method that predicts slopes (Sen's slope estimate) or a method that performs trend analysis by taking into account periodicity in a time series (Hodrick-Prescott Filter) may be used.

The software aging test system described above can be implemented by hardware, software or a combination of software and hardware. The software aging test method performed by the software aging test system described above can also be implemented by hardware, software or a combination of software and hardware. Implementation by software herein means that the system is implemented by a computer which reads and executes a program.

The program can be stored on any of a various types of non-transitory computer readable media and can be provided to a computer. The non-transitory computer readable media include various types of tangible storage media. Examples of non-transitory computer readable media include a magnetic recording medium (for example a flexible disk, a magnetic tape, and a hard disk drive), an magneto-optic recording medium (for example, a magneto-optic disk), a CD-ROM (Read Only memory), a CD-R, a CD-R/W, and a semiconductor memory (for example a mask ROM, a PROM (Programmable ROM), an EPROM (Erasable PROM), a flash ROM, and a RAM (random access memory)). The program may be provided using any of various types of transitory computer readable media to a computer. Examples of transitory computer readable media include an electrical signal, an optical signal, and an electromagnetic wave. A transitory computer readable medium can provide the program to a computer through a wired communication path such as an electrical cable or an optical fiber, or a wireless communication path.

Part or all of the exemplary embodiments described above can also be described as in the following Supplementary Notes, but are not limited to them.

(Supplementary Note 1)

A software aging test system, wherein load test of a version of software under test is executed in accordance with an execution criterion, presence or absence of a software aging problem is detected by comparing a test result of the load test with a test result of load test of a previous version of the software to be compared, and frequency of execution of subsequent load test is adjusted by changing the execution criterion based on a result of the detection (Supplementary Note 2)

The software aging test system according to Supplementary Note 1, comprising:

determination means for obtaining an amount of change quantitatively indicating a difference between a software version under test and a latest good software version that is free of a software aging problem and determining, from the amount of change, whether or not a load test is necessary to be executed based on the execution criterion;

execution means for executing load test of the software version under test when an execution of the load test is determined as necessary by the determination means;

detection means for detecting presence or absence of a software aging problem by comparing a test result of the load test of the software version under test obtained by the execution means with a previously obtained test result of load test of the latest good software version; and update means for updating the execution criterion based on a result of the detection of the presence or absence of a software aging problem.

(Supplementary Note 3)

The software aging test system according to Supplementary Note 2, wherein the amount of change includes an amount of change in number of commits of the software, and a threshold value of the amount of change is used as the execution criterion.

(Supplementary Note 4)

The software aging test system according to Supplementary Note 2, wherein the amount of change comprises an amount of change in software metrics including one or more metrics selected from the group consisting code line count, feature count, object count, function count, and external library count in the software and a threshold value of the amount of change in software metrics is used as the execution criterion.

(Supplementary Note 5)

The software aging test system according to Supplementary Note 2, wherein the amount of change includes an amount of change in an elapsed time in software development, and a threshold value of the amount of change is used as the execution criterion.

(Supplementary Note 6)

The software aging test system according to any one of Supplementary Notes 2 to 5, wherein the detection means detects the presence or absence of a software aging problem by comparing change in memory space consumed by the software with time during the load test between the two test results.

(Supplementary Note 7)

The software aging test system according to any one of Supplementary Notes 2 to 5, wherein the detection means detects whether presence or absence of a software aging problem exists by comparing changes with time in one or more metrics selected from the group consisting of free memory capacity, virtual memory size, used swap size, free disk capacity, and the number of processes count in the load test between both the two test results.

(Supplementary Note 8)

The software aging test system according to Supplementary Notes 6 or 7, wherein when comparing the change with time between the two test results, the change with time is linearly approximated by linear regression analysis, and slopes of approximate line is compared between the two test results.

(Supplementary Note 9)

The software aging test system according to any one of Supplementary Notes 2 to 8, wherein when the detection mean detects no software aging problem, the update means updates the execution criterion so as to lengthen an interval at which a load test is executed.

(Supplementary Note 10)

The software aging test system according to any one of Supplementary Notes 2 to 9, wherein when the detection means has detected detects a software aging problem, the update means updates the execution criterion so as to shorten the an intervals at which a load test is executed.

(Supplementary Note 11)

The software aging test system according to any one of Supplementary Notes 2 to 8, further comprising debugging result input means for inputting a result of debugging executed when a software aging problem is detected, wherein the update means updates the execution criterion based on a debugging result input by the debugging result input means and the result of the detection of presence or absence of a software aging problem by the detection means.

(Supplementary Note 12)

The software aging test system according to Supplementary Note 11, wherein the update means determines whether the debugging result and the result of the detection of presence or absence of a software aging problem agree with each other, and updates the execution criterion so as to shorten an interval at which a load test is executed when the results do not agree with each other.

(Supplementary Note 13)

The software aging test system according to Supplementary Notes 11 or 12, wherein the update means determines whether the debugging result and the result of the detection of presence or absence of a software aging problem agree with each other and, when the results agree with each other, the update means maintains the execution criterion or updates the execution criterion so as to lengthen an interval at which a load test is executed.

(Supplementary Note 14)

A software aging test method comprising: executing load test of a version of software under test in accordance with an execution criterion; detecting presence or absence of a software aging problem by comparing a test result of the load test with a test result of load test of a previous version of the software to be compared; and adjusting frequency of execution of subsequent load test by changing the execution criterion based on a result of the detection.

(Supplementary Note 15)

The software aging test method according to Supplementary Note 14, comprising:

a determination step of obtaining an amount of change quantitatively indicating a difference between a software version under test and a latest good software version that is free of a software aging problem and determining, from the amount of change, whether load test is necessary to be executed based on the execution criterion;

an execution step of executing load test of the software version under test when an execution of the load test is determined as necessary by the determination step;

a detection step of detecting presence or absence of a software aging problem by comparing a test result of the load test of the software version under test obtained by the execution step with a previously obtained test result of load test of the latest good software version; and an update step of updating the execution criterion based on a result of the detection of the presence or absence of a software aging problem.

(Supplementary Note 16)

The software aging test method according to Supplementary Note 15, wherein the amount of change includes an amount of change in number of commits of the software, and a threshold value of the amount of change is used as the execution criterion.

(Supplementary Note 17)

The software aging test method according to Supplementary Note 15, wherein the amount of change comprises an amount of change in software metrics including one or more metrics selected from the group consisting of code line count, feature count, object count, function count, and external library count included in the software and a threshold value of the amount of change in software metrics is used as the execution criterion.

(Supplementary Note 18)

The software aging test method according to Supplementary Note 15, wherein the amount of change includes an amount of change in an elapsed time in software development, and a threshold value of the amount of change is used as the execution criterion.

(Supplementary Note 19)

The software aging test method according to any one of Supplementary Notes 15 to 18, wherein in the detection step, the presence or absence of a software aging problem is detected by comparing change in memory space consumed by the software with time during the load test between the two test results.

(Supplementary Note 20)

The software aging test method according to any one of Supplementary Notes 15 to 18, wherein in the detection step, presence or absence of a software aging problem is detected by comparing change with time in one or more metrics selected from the group consisting of free memory capacity, virtual memory size, used swap size, free disk capacity, and process count in the load test between the two test results.

(Supplementary Note 21)

The software aging test method according to Supplementary Notes 19 or 20, wherein when comparing the change with time between the two test results, the changes with time is linearly approximated by linear regression analysis, and slopes of approximate line is compared between the two test results.

(Supplementary Note 22)

The software aging test method according to any one of Supplementary Notes 15 to 21, wherein when no software aging problem is detected in the detection step, the execution criterion is updated in the update step so as to lengthen an interval at which a load test is executed.

(Supplementary Note 23)

The software aging test method according to any one of Supplementary Notes 15 to 22, wherein when a software aging problem is detected in the detection step, the execution criterion is updated in the update step so as to shorten an interval at which a load test is executed.

(Supplementary Note 24)

The software aging test method according to any one of Supplementary Notes 15 to 21, further comprising a debugging result input step of inputting a result of debugging executed when a software aging problem is detected, wherein in the update step, the execution criterion is updated based on a debugging result input in the debugging result input step and a result of the detection of presence or absence of a software aging problem in the detection step.

(Supplementary Note 25)

The software aging test method according to Supplementary Note 24, wherein in the update step, it is determined whether the debugging result and the result of the detection of presence or absence of a software aging problem agree with each other, and the execution criterion is updated so as to shorten an interval at which a load test is executed when the results do not agree with each other.

(Supplementary Note 26)

The software aging test method according to Supplementary Notes 24 or 25, wherein in the update step, it is determined whether the debugging result and the result of the detection of presence or absence of a software aging problem agree with each other and, when the results agree with each other, the execution criterion is maintained or the execution criterion is updated so as to lengthen an interval at which a load test is executed.

(Supplementary Note 27)

A program for software aging test which causes a computer to execute operation to execute load test of a version of software under test in accordance with an execution criterion, detect presence or absence of a software aging problem by comparing a test result of the load test with a test result of load test of a previous version of the software to be compared, and adjust the frequency of execution of subsequent load test by changing the execution criterion based on a result of the detection.

(Supplementary Note 28)

The program for software aging test according to Supplementary Note 27 which causes a computer to execute:

determination processing of obtaining an amount of change quantitatively indicating a difference between a software version under test and a latest good software version that is free of a software aging problem and determining, from the amount of change, whether load test is necessary to be executed based on the execution criterion;

execution processing of executing load test of the software version under test when an execution of the load test is determined as necessary by the determination step;

detection processing of detecting presence or absence of a software aging problem by comparing a test result of the load test of the software version under test obtained by the execution operation with a previously obtained test result of load test of the latest good software version; and update processing of updating the execution criterion based on a result of detection of the presence or absence of a the software aging problem.

(Supplementary Note 29)

The program for software aging test according to Supplementary Note 28, wherein the amount of change includes an amount of change in number of commits of the software, and a threshold value of the amount of change is used as the execution criterion.

(Supplementary Note 30)

The program for software aging test according to Supplementary Note 28, wherein the amount of change comprises an amount of change in software metrics including one or more metrics selected from the group consisting of code line count, feature count, object count, the number of function count, and external library count included in the software and a threshold value of the amount of change in software metrics is used as the execution criterion.

(Supplementary Note 31)

The program for software aging test according to Supplementary Note 28, wherein the amount of change includes an amount of change in an elapsed time in software development, and a threshold value of the amount of change is used as the execution criterion.

(Supplementary Note 32)

The program for software aging test according to any one of claims 28 to 31, wherein in the detection processing, the presence or absence of a software aging problem is detected by comparing change in memory space consumed by the software with time during the load test between the two test results.

(Supplementary Note 33)

The program for software aging test according to any one of Supplementary Notes 28 to 31, wherein in the detection processing, presence or absence of a software aging problem is detected by comparing change with time in one or more metrics selected from the group consisting of free memory capacity, virtual memory size, used swap size, free disk capacity, and process count in the load test between the two test results.

(Supplementary Note 34)

The program for software aging test according to Supplementary Notes 32 or 33, wherein when comparing the change with time between the two test results, the change with time is linearly approximated by linear regression analysis, and slopes of approximate line is compared between the two test results.

(Supplementary Note 35)

The program for software aging test according to any one of Supplementary Notes 28 to 34, wherein when no software aging problem is detected in the detection processing, the execution criterion is updated in the update processing so as to lengthen an interval at which a load test is executed.

(Supplementary Note 36)

The program for software aging test according to any one of Supplementary Notes 28 to 35, wherein when a software aging problem is detected in the detection processing, the execution criterion is updated in the update processing so as to shorten an interval at which a load test is executed.

(Supplementary Note 37)

The program for software aging test according to any one of Supplementary Notes 28 to 34, further causing the computer to execute debugging result input processing to input a result of debugging executed when a software aging problem is detected, wherein in the update processing, the execution criterion is updated based on a debugging result input in the debugging result input processing and the result of the detection of presence or absence of a software aging problem obtained in the detection processing.

(Supplementary Note 38)

The program for software aging test according to Supplementary Note 37, wherein in the update processing, whether the debugging result and the result of the detection of presence or absence of a software aging problem agree with each other is determined, and the execution criterion is updated so as to shorten an interval at which a load test is executed when the results do not agree with each other.

(Supplementary Note 39)

The program for software aging test according to Supplementary Notes 37 or 38, wherein in the update processing, it is determined whether the debugging result and the result of the detection of presence or absence of a software aging problem agree with each other and, when the results agree with each other, the execution criterion is maintained or the execution criterion is updated so as to lengthen an interval at which a load test is executed.

This application is based upon and claims priority of Paris Convention on Japanese Patent Application No. 2013-167466 (filed on Aug. 12, 2013), the disclosure of which is incorporated herein by reference.

While typical exemplary embodiments of the present invention have been described in detail, it should be understood that various changes, substitutions and alternatives can be made without departing from the spirit and scope of the present invention defined in the Claims. Further, the inventor intends that the equivalent scope of the claimed invention be maintained even if any of the claims are amended in the application procedure.

INDUSTRIAL APPLICABILITY

The present invention is applicable to applications such as software test systems for improving the reliability of software, for example. Further, the present invention is also applicable to applications such as software development project management systems for improving the efficiency of development of software.

REFERENCE SIGNS LIST

100 Software aging test system
101 Software version management storage device
102 Change amount check means
103 Change amount threshold value storage device
104 Load test means
105 Load test results storage device
106 Test results comparison means
107 Threshold value update means

What is claimed is:

1. A software aging test system comprising:
a circuitry configured to:
   execute load test of a version of software under test in accordance with an execution criterion;
   detect presence or absence of a software aging problem by comparing a test result of the load test with a test result of load test of a previous version of the software to be compared;
   update the execution criterion so as to change frequency of execution of subsequent load test based on a result of the detection;
   obtain an amount of change quantitatively indicating a difference between a software version under test and a latest stable version of software, the latest stable version of software being free of a software aging problem;
   determine, from the amount of change, whether or not a load test is necessary to be executed based on the execution criterion;
   execute load testing of the software version under test when an execution of the load test is determined as necessary by the determination;
   detect presence or absence of a software aging problem by comparing a test result of the load test of the software version under test with a previously obtained test result of load testing of the latest stable version of software; and
   update the execution criterion so as to change the frequency of the execution of subsequent load test based on a result of the detection of the presence or absence of a software aging problem.

2. The software aging test system according to claim 1, wherein the amount of change includes an amount of change in number of commits of the software, and a threshold value of the amount of change is used as the execution criterion.

3. The software aging test system according to claim 1, wherein the amount of change comprises an amount of change in software metrics including one or more metrics selected from the group consisting code line count, feature count, object count, function count, and external library count in the software and a threshold value of the amount of change in software metrics is used as the execution criterion.

4. The software aging test system according to claim 1, wherein the amount of change includes an amount of change in an elapsed time in software development, and a threshold value of the amount of change is used as the execution criterion.

5. The software aging test system according to claim 1, wherein the circuitry detects the presence or absence of a software aging problem by comparing change in memory space consumed by the software with time during the load test between the two test results.

6. The software aging test system according to claim 5, wherein when comparing the change with time between the two tests results, the change with time is linearly approximated by linear regression analysis, and slopes of approximate line is compared between the two test results.

7. The software aging test system according to claim 1, wherein the circuitry further configured to:
   detect presence or absence of a software aging problem by comparing change with time in one or more metrics selected from the group consisting of free memory capacity, virtual memory size, used swap size, free disk capacity, and process count in the load testing between the two test results.

8. The software aging test system according to claim 1, wherein when the circuitry detects no software aging problem, the circuitry updates the execution criterion so as to lengthen an interval at which a load test is executed.

9. The software aging test system according to claim 1, wherein when the circuitry detects a software aging problem, the circuitry updates the execution criterion so as to shorten an interval at which a load test is executed.

10. The software aging test system according to claim 1, wherein the circuitry further configured to
   input a result of debugging executed when a software aging problem is detected; and
   update the execution criterion based on a debugging result input and the result of the detection of presence or absence a software aging problem.

11. The software aging test system according to claim 10, wherein the circuitry further configured to
   determine whether the debugging result and the result of the detection of presence or absence of a software aging problem agree with each other; and
   update the execution criterion so as to shorten the interval at which a load test is executed when the results do not agree with each other.

12. The software aging test system according to claim 10, wherein the circuitry further configured to determine whether the debugging result and the result of the detection of presence or absence of a software aging problem agree with each other and;
   maintain the execution criterion or updates the execution criterion so as to lengthen an interval at which a load test is executed when the results agree with each other.

13. A software aging test method comprising:
   executing load test of a version of software under test in accordance with an execution criterion;
   detecting presence or absence of a software aging problem by comparing a test result of the load test with a test result of load test of a previous version of the software to be compared;

updating the execution criterion so as to change frequency of execution of subsequent load test by changing the execution criterion based on a result of the detection;
obtaining an amount of change quantitatively indicating a difference between a software version under test and a latest stable software version, the latest stable software version being free of a software aging problem;
determining, from the amount of change, whether load testing is necessary to be executed based on the execution criterion;
executing load testing of the software version under test when an execution of the load test is determined as necessary by the determination;
detecting presence or absence of a software aging problem by comparing a test result of the load test of the software version under test obtained by the execution with a previously obtained test result of load testing of the latest stable software version; and
updating the execution criterion based on a result of the detection of the presence or absence of a software aging problem.

14. The software aging test method according to claim 13, further comprising:
inputting a result of debugging executed when a software aging problem is detected,
wherein in the update, the execution criterion is updated based on a debugging result input in the input and a result of the detection of presence or absence of a software aging problem in the detection step.

15. A non-transitory computer-readable recording medium storing program for software aging test which causes a computer to:
execute load test of a version of software under test in accordance with an execution criterion;
detect presence or absence of a software aging problem by comparing a test result of the load test with a test result of load test of a previous version of the software to be compared;
update the execution criterion so as to change frequency of execution of subsequent load test by changing the execution criterion based on a result of the detection;
obtain an amount of change quantitatively indicating a difference between a software version under test and a latest stable software version, the latest stable software version being free of a software aging problem and determining, from the amount of change, whether load testing is necessary to be executed based on the execution criterion;
execute load testing of the software version under test when an execution of the load test is determined as necessary by the determination step;
detect presence or absence of a software aging problem by comparing a test result of the load test of the software version under test obtained by the execution operation with a previously obtained test result of load testing of the latest stable software version; and
update the execution criterion based on a result of detection of the presence or absence of a the software aging problem.

16. The non-transitory computer-readable recording medium storing program for software aging test according to claim 15, further causing the computer to execute debugging result input processing to input a result of debugging executed when a software aging problem is detected,
wherein in the update processing, the execution criterion is updated based on a debugging result input in the debugging result input processing and the result of the detection of presence or absence a software aging problem obtained in the detection processing.

* * * * *